US010759887B2

(12) United States Patent
Ohkura et al.

(10) Patent No.: US 10,759,887 B2
(45) Date of Patent: Sep. 1, 2020

(54) ELECTRIC WIRE, COIL AND METHOD FOR PRODUCING ELECTRIC WIRE

(71) Applicant: AGC Inc., Chiyoda-ku (JP)

(72) Inventors: Masahiro Ohkura, Chiyoda-ku (JP); Norihide Sugiyama, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/452,610

(22) Filed: Jun. 26, 2019

(65) Prior Publication Data
US 2019/0315896 A1 Oct. 17, 2019

Related U.S. Application Data

(63) Continuation of application No. PCT/JP2018/005275, filed on Feb. 15, 2018.

(30) Foreign Application Priority Data

Mar. 2, 2017 (JP) .................................. 2017-039178

(51) Int. Cl.
H01B 3/02 (2006.01)
C08F 214/26 (2006.01)
C09D 127/18 (2006.01)
H01B 3/44 (2006.01)
H01B 13/00 (2006.01)
H01B 13/06 (2006.01)
H01F 27/28 (2006.01)
H01F 27/32 (2006.01)

(52) U.S. Cl.
CPC ........ C08F 214/262 (2013.01); C09D 127/18 (2013.01); H01B 3/445 (2013.01); H01B 13/0016 (2013.01); H01B 13/06 (2013.01); H01F 27/2823 (2013.01); H01F 27/32 (2013.01); C08F 2800/10 (2013.01)

(58) Field of Classification Search
CPC . H01B 7/02; H01B 7/04; H01B 7/292; H01B 7/025
USPC .......................................... 174/110 R–110 E
See application file for complete search history.

(56) References Cited

U.S. PATENT DOCUMENTS 5,089,200 A * 2/1992 Chapman, Jr. .......... B29C 48/32
264/127
2005/0070637 A1* 3/2005 Nishibayashi ....... C08G 73/101
524/80
2007/0106026 A1* 5/2007 Namura .................. C08L 27/18
525/199
2009/0038821 A1* 2/2009 Sato ..................... C08F 214/262
174/120 R
2016/0137947 A1* 5/2016 Isobe .................. C07F 9/65815
508/548
2016/0280865 A1* 9/2016 Sugiyama ............. C08F 214/18
2016/0319089 A1* 11/2016 Imamura .................. C08J 7/123
2016/0322128 A1* 11/2016 Imamura .................... C08J 3/28
2018/0162974 A1* 6/2018 Sugiyama ............... C08F 16/28

FOREIGN PATENT DOCUMENTS

| JP | 4591352 | 12/2010 |
| WO | WO 2015/022871 A1 | 2/2015 |
| WO | WO 2015/098773 A1 | 7/2015 |
| WO | WO 2015/104974 A1 | 7/2015 |
| WO | WO 2015/129913 A1 | 9/2015 |
| WO | WO 2018/159307 A1 | 9/2018 |

OTHER PUBLICATIONS

U.S. Appl. No. 15/176,408, filed Jun. 8, 2019, US 2016-0280865 A1, Sugiyama, N., et al.
U.S. Appl. No. 15/890,873, filed Feb. 7, 2018, US 2019-0162974 A1, Sugiyama, N., et al.
U.S. Appl. No. 16/267,407, filed Feb. 5, 2019, 2019-0169326 A1, Sugiyama, N., et al.
U.S. Appl. No. 16/451,243, filed Jun. 25, 2019, Ohkura, M., et al.
International Search Report dated Apr. 10, 2018 in PCT/JP2018/005275 dated Feb. 15, 2018.
International Search Report issued Apr. 10, 2018 in PCT/JP2018/005275 dated Feb. 15, 2018.

* cited by examiner

Primary Examiner — William H. Mayo, III
(74) Attorney, Agent, or Firm — Oblon, McClelland, Maier & Neustadt, L.L.P.

(57) ABSTRACT

An electric wire and coil covered with a cured product of a heat- or photo-curable fluorinated polymer and having high insulating properties and high productivity. An electric wire having a conductor wire and a covering layer covering the outer periphery of the conductor wire. The covering layer is made of a cured product of a curable composition which has a fluorinated polymer containing at least three functional groups represented by the following formula (F): —$R^{f1}COZ^1$ (F). In formula (F), $R^{f1}$ is a single bond, a fluoroalkylene group, or a fluoroalkylene group with at least two carbon atoms having an etheric oxygen atom between carbon-carbon atoms, $Z^1$ is $NR^1NR^2H$, $NR^3OR^4$ or $OR^5$, and $R^1$, $R^2$, $R^3$, $R^4$ and $R^5$ are each independently a hydrogen atom or an alkyl group.

10 Claims, No Drawings

ELECTRIC WIRE, COIL AND METHOD FOR PRODUCING ELECTRIC WIRE

TECHNICAL FIELD

The present invention relates to an electric wire, a coil using it, and a method for producing the electric wire.

BACKGROUND ART

In order to promote miniaturization and weight reduction of mobile devices, automobiles, etc., electric wires to be used for these applications are required to have their diameters reduced. Accordingly, it is required to form a covering layer made of an 15 insulating material covering the core wire (i.e. the inner conductor), with a thin thickness.

Heretofore, a liquid insulating varnish having a thermosetting resin dissolved in a solvent has been used for producing an enamel wire to be used for a winding wire. In order to produce an enamel wire by using the liquid insulating varnish, a core wire is 20 immersed in and coated with the liquid insulating varnish, which is then baked and thermally cured to form a covering layer. In such a case, it is possible to reduce the thickness of the covering layer e.g. by adjusting the concentration of the thermosetting resin in the liquid insulating varnish. In recent years, in order to increase productivity, a polyimide composition containing a photocurable polyimide has been proposed as a 25 liquid insulating varnish in Patent Document 1.

On the other hand, in the case of an electric wire other than a winding wire, a core wire is usually covered by extrusion molding a thermoplastic resin. In Patent Document 2, a tetrafluoroethylene/perfluoro(alkyl vinyl ether) copolymer, which is a fluorinated resin having a low relative dielectric constant and capable of being thinned, has been proposed in order to suppress a transmission loss.

PRIOR ART DOCUMENTS

Patent Documents

Patent Document 1: WO2015/129913
Patent Document 2: Japanese Patent No. 4,591,352

DISCLOSURE OF INVENTION

Technical Problem

However, the thermosetting resin used in the liquid insulating varnish disclosed in Patent Document 1 had lower insulating properties than a fluorinated resin, in particular, a perfluoro resin. On the other hand, the extrusion molding of the fluorinated resin disclosed in Patent Document 2, required an expensive molding machine which was resistant to acid components generated during the molding.

It is an object of the present invention to provide an electric wire and coil covered with a cured product of a heat- or photo-curable fluorinated polymer and having high insulating properties and high productivity. It is another object of the present invention to provide a method for producing an electric wire, whereby it is possible to produce an electric wire having high insulating properties by using a simple apparatus.

Solution to Problem

The present invention provides an electric wire, a method for its production and a coil, having the following constructions [1] to [10].

[1] An electric wire comprising a conductor wire and a covering layer covering the outer periphery of the conductor wire, wherein the covering layer is made of a cured product of a curable composition containing a fluorinated polymer containing at least three functional groups represented by the following formula (F):

(in the formula (F), $R^{f1}$ is a single bond, a fluoroalkylene group, or a fluoroalkylene group with at least two carbon atoms having an etheric oxygen atom between carbon-carbon atoms, $Z^1$ is $NR^1NR^2H$, $NR^3OR^4$ or $OR^5$, and $R^1$, $R^2$, $R^3$, $R^4$ and $R^5$ are each independently a hydrogen atom or an alkyl group.)

[2] The electric wire according to [1], wherein the fluorinated polymer contains at least one of the functional groups represented by the formula (F) in a unit represented by the following formula (U1):

(in the formula (U1), $X^1$ and $X^2$ are each independently a hydrogen atom or a fluorine atom, $Q^1$ is a single bond or an etheric oxygen atom, $R^1$ is a single bond, a fluoroalkylene group, or a fluoroalkylene group with at least two carbon atoms having an etheric oxygen atom between carbon-carbon atoms, $Z^1$ is $NR^1NR^2H$, $NR^3OR^4$ or $OR^5$, and $R^1$, $R^2$, $R^3$, $R^4$ and $R^5$ are each independently a hydrogen atom or an alkyl group.)

[3] The electric wire according to [2], wherein the fluorinated polymer contains at least three units represented by formula (U1).

[4] The electric wire according to [1], wherein the fluorinated polymer contains at least three groups represented by the following formula (F1):

(in the formula (F1), $R^{f2}$ is a $C_{1-4}$ perfluoroalkylene group; k is an integer of from 1 to 200; $R^{f1}$ is a single bond, a fluoroalkylene group, or a fluoroalkylene group with at least two carbon atoms having an etheric oxygen atom between carbon-carbon atoms; $Z^1$ is $NR^1NR^2H$, $NR^3OR^4$ or $OR^5$; and $R^1$, $R^2$, $R^3$, $R^4$ and $R^5$ are each independently a hydrogen atom or an alkyl group.)

[5] The electric wire according to [4], wherein the fluorinated polymer is a compound in which three or four groups represented by the formula (F1) are bonded to one carbon atom.

[6] The electric wire according to any one of [1] to [5], wherein the amount of fluorine atoms contained in the fluorinated polymer is from 50 to 76 mass %.

[7] The electric wire according to any one of [1] to [6], wherein the conductor wire is made of a copper conductor or an aluminum conductor.

[8] A method for producing the electric wire as defined in any one of [1] to [7], characterized by covering the outer periphery of the conductor wire with the curable composition to form a precursor layer of the covering layer, and applying heat and/or irradiating active energy rays to the precursor layer, to obtain a covering layer made of a cured product of the curable composition.

[9] The method of producing the electric wire according to [8], wherein the precursor layer is formed by applying a coating composition comprising the curable composition and a liquid having a boiling point of at most 250° C. to the outer periphery of the conductor wire, and volatilizing the liquid from the applied coating composition.

[10] A coil formed by forming the electric wire as defined in any one of [1] to [7] into a coil shape.

Advantageous Effects of Invention

According to the present invention, it is possible to provide an electric wire and coil covered with a cured product of a heat- or photo-curable fluorinated polymer and having high insulating properties and high productivity.

Further, according to the present invention, it is possible to provide a method for producing an electric wire, whereby it is possible to produce an electric wire having high insulating properties by using a simple apparatus.

DESCRIPTION OF EMBODIMENTS

Hereinafter, embodiments of the present invention will be described. However, the present invention should not be construed as being limited to the following description.

Meanings of Terms in this Specification

A compound represented by the formula (a) may sometimes be referred to as a compound (a). Compounds represented by other formulae may also be referred to in the same manner. A unit represented by the formula (b) may sometimes be referred to as a unit (b). Units represented by other formulae may also be referred to in the same manner. A group represented by the formula (c) may be referred to as a group (c). Groups represented by other formulae may also be referred to in the same manner.

A "unit" in a polymer means a moiety derived from a monomer, formed by polymerization of the monomer. A unit derived from a monomer may also be referred to simply as a monomer unit. For example, a unit derived from a fluoroethylene may be referred to as a "fluoroethylene unit".

A "fluoroethylene" means a compound in which from 0 to 3 fluorine atoms in tetrafluoroethylene ($CF_2=CF_2$) are substituted by hydrogen atom(s) or halogen atom(s) other than fluorine (e.g. chlorine, bromine or iodine).

A group having a carbon atom chain, such as an alkyl group, a fluoroalkyl group, a fluoroalkylene group, a fluoroalkoxy group or a fluoroalkenyl group, may be linear or branched.

A "fluoroalkyl group" means a group in which at least one of hydrogen atoms in an alkyl group is substituted by a fluorine atom. The proportion of fluorine atoms in a fluoroalkyl group is preferably at least 50%, particularly preferably 100% i.e. a perfluoroalkyl group, when expressed by (the number of fluorine atoms in the fluoroalkyl group)/(the number of hydrogen atoms in an alkyl group having the same number of carbon atoms corresponding to the fluoroalkyl group)×100(%). The same applies to a fluoroalkylene group, a fluoroalkoxy group and a fluoroalkenyl group, and a perfluoroalkylene group, a perfluoroalkoxy group and a perfluoroalkenyl group are particularly preferred.

"Curing" means curing by crosslinking, unless otherwise stated.

A "precursor layer" means a layer to form a covering layer when cured, and, as used herein, refers to a layer of a curable composition.

In this specification, "to" representing a numerical range includes an upper limit and a lower limit.

[Electric Wire]

The electric wire of the present invention comprises a conductor wire and a covering layer covering the outer periphery of the conductor wire, wherein the covering layer is made of a cured product of a curable composition comprising a fluorinated polymer (hereinafter referred to also as a fluorinated polymer (A)) containing at least three functional groups represented by the following formula (F):

$$—R^{f1}COZ^1 \qquad (F)$$

(in the formula (F), $R^{f1}$ is a single bond, a fluoroalkylene group, or a fluoroalkylene group with at least two carbon atoms having an etheric oxygen atom between carbon-carbon atoms, $Z^1$ is $NR^1NR^2H$, $NR^3OR^4$ or $OR^5$, and $R^1$, $R^2$, $R^3$, $R^4$ and $R^5$ are each independently a hydrogen atom or an alkyl group.).

(Conductor Wire)

As the conductor wire (referred to also as a "core wire"), a conductor wire used for an electric wire may be generally used without any particular limitation. As the constituent material of the conductor wire, a copper conductor, an aluminum conductor, etc. may be mentioned. Here, a copper conductor means a conductor, in which copper is the main component, and oxygen-free copper, low-oxygen copper or the like is mainly used. The same applies to an aluminum conductor. Further, the conductor is not limited to this, and, for example, a conductor in which metal plating of e.g. nickel, chromium, silver or tin is applied to the outer periphery of a copper wire may be used.

The largest diameter in a cross section orthogonal to the length direction of the conductor wire is preferably from 0.002 to 20 mm. The cross-sectional shape orthogonal to the length direction of the conductor wire may be a round shape, a foil shape, or a polygonal shape such as a quadrangular shape. In the case of a polygonal shape, a shape having a predetermined curvature, in which corner portions are not sharp, is also included.

The conductor wire (core wire) may be used as a single wire composed of a single conductor, or may be used as a twisted wire composed of a plurality of conductors combined.

(Covering Layer)

The covering layer covering the outer periphery of the conductor wire is made of a cured product of a curable composition containing a fluorinated polymer (A). The term "having a covering layer covering the outer periphery of the conductor wire" means that the covering layer is formed along the outer periphery of the conductor wire in any cross section orthogonal to the length direction of the conductor wire. In the electric wire of the present invention, a further covering layer may be provided between the conductor wire and the covering layer or on the outside of the covering layer. The thickness of the covering layer is appropriately adjusted according to the purpose or type of the electric wire. The covering layer, for example, preferably has a thickness of from 1 to 1,000 μm and more preferably has a thickness of from 10 to 1,000 μm.

The curable composition is a composition that contains a fluorinated polymer (A) as a curable component and does not contain a volatile component such as a solvent.

The crosslinking reaction of the fluorinated polymer (A) occurs on the basis of groups (F).

When $Z^1$ in groups (F) is $OR^5$, it is assumed that $—R^{f1}$ radicals are generated from the groups (F) by the deCOZ$^1$ reaction by irradiation of active-energy rays, and the $—R^{f1}$ radicals are bonded by coupling.

When $Z^1$ is $NR^1NR^2H$, it is assumed that groups (F) are coupled each other to form crosslinked sites of a diacylhydrazine or tetrazine structure by irradiation of active-energy rays and/or heating.

When $Z^1$ is $NR^3OR^4$, it is considered that $—R^{f1}$ radicals are generated from groups (F) by the deCOZ$^1$ reaction by irradiation of active-energy rays and/or heating, and $—R^{f1}$ radicals are bonded by coupling.

When groups (F) comprise both a group in which $Z^1$ is $NR^1NR^2H$ and a group in which $Z^1$ is $OR^5$, it is assumed that both groups react with each other by heating as shown by the follow formula:

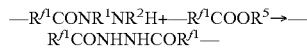

In any one of the above crosslinking reactions, it is preferred to carry out the reaction under predetermined conditions, for example, in the presence of an inert gas such as nitrogen.

The curable composition may consist only of the fluorinated polymer (A), or may contain a reactive component (hereinafter referred to also as "other reactive component") other than the fluorinated polymer (A) within a range not to inhibit the above-mentioned crosslinking reaction of the fluorinated polymer (A). Other reactive component may be a fluorinated polymer having one or two groups (F), a silane coupling agent for improving the adhesion to e.g. a conductor wire, etc. The curable composition may further contain a non-reactive component. Hereinafter, each component contained in the curable composition will be described.

(Fluorinated Polymer (A))

The fluorinated polymer (A) contains at least three groups (F) per molecule:

$$—R^{f1}COZ^1 \quad (F)$$

(in the formula (F), $R^{f1}$ is a single bond, a fluoroalkylene group, or a fluoroalkylene group with at least two carbon atoms having an etheric oxygen atom between carbon-carbon atoms, $Z^1$ is $NR^1NR^2H$, $NR^3OR^4$ or $OR^5$, and $R^1$, $R^2$, $R^3$, $R^4$ and $R^5$ are each independently a hydrogen atom or an alkyl group.).

When $R^{f1}$ in a group (F) is a fluoroalkylene group, the number of carbons is preferably from 1 to 6, particularly preferably from 1 to 4. When the number of carbon atoms is at least 3, a linear chain structure is preferred from the viewpoint of excellent thermal stability. The fluoroalkylene group is preferably a perfluoroalkylene group from the viewpoint of excellent thermal stability. That is, as $R^{f1}$, a $C_{1-6}$ perfluoroalkylene group is preferred, and a $C_{1-4}$ perfluoroalkylene group is particularly preferred.

When $R^{f1}$ is a fluoroalkylene group with at least two carbon atoms having an etheric oxygen atom between carbon-carbon atoms, the number of carbon atoms is preferably from 2 to 10, particularly preferably from 2 to 6. When the number of carbon atoms is at least 3, a linear chain structure is preferred from the viewpoint of excellent thermal stability. The fluoroalkylene group is preferably a perfluoroalkylene group from the viewpoint of excellent thermal stability. That is, as $R^{f1}$, a $C_{2-10}$ perfluoroalkylene group having an etheric oxygen atom between carbon-carbon atoms is preferred, and a $C_{2-6}$ perfluoroalkylene group having an etheric oxygen atom between carbon-carbon atoms is particularly preferred.

As $R^{f1}$, specifically, $CF_2$, $(CF_2)_2$, $(CF_2)_3$, $(CF_2)_4$, $CF_2CF(CF_3)O(CF_2)_2$, $CF_2CF(CF_3)O(CF_2)_3$, $(CF_2)_3O(CF_2)_2$, $(CF_2)_2O(CF_2)_2$, $CF_2OCF(CF_3)$, $CF_2OCF(CF_3)CF_2OCF(CF_3)$, etc. are preferred.

$R^1$, $R^2$, $R^3$ and $R^4$ are each independently preferably a hydrogen atoms or a $C_{1-6}$ alkyl group, more preferably a hydrogen atom or a $C_{1\ or\ 2}$ alkyl group, further preferably a methyl group or a hydrogen atom, particularly preferably a hydrogen atom, from the viewpoint of high hydrogen bonding properties and excellent solubility in an alcohol of the fluorinated polymer (A).

$R^5$ is preferably a $C_{1-6}$ alkyl group, more preferably a $C_{1\ or\ 2}$ alkyl group, particularly preferably a methyl group, from such a viewpoint that the fluorinated polymer (A) will have excellent fluidity when heated. From the viewpoint of high transparency of the cured product of the curable composition containing the fluorinated polymer (A), $R^5$ is preferably a hydrogen atom or a methyl group, particularly preferably a hydrogen atom.

As $—COZ^1$, specifically, $—COOH$, $—COOCH_3$, $—COOC_2H_5$, $—CONHNH_2$, $—CON(CH_3)NHCH_3$, $—CONHOH$, $—CONHOCH_3$, etc. are preferred.

The number of groups (F) in the fluorinated polymer (A) is at least 3, preferably from 3 to 100, more preferably from 3 to 30. The types of groups (F) may be different or the same. The combination of groups (F) may be appropriately selected according to the type of the above crosslinking reaction.

When $Z^1$ in a group (F) is $NR^1NR^2H$ or $NR^3OR^4$, there is such an advantage that the fluorinated polymer (A) will be dissolved in an alcohol even if the fluorine atom content is high like a perfluoropolymer.

As the alcohol, methanol, ethanol, n-propanol, isopropanol, n-butanol, isobutanol, tert-butanol, methoxyethanol, methoxypropanol, etc. may be mentioned, and methanol and ethanol are preferred.

When the fluorinated polymer (A) is required to have solubility in an alcohol, it is possible to obtain a fluorinated polymer (A) having a dissolution amount of e.g. at least 2 mass % to the total of the alcohol (preferably methanol) and the fluorinated polymer (A) at room temperature (25° C.) by adjusting the types and ratio of groups (F) in the fluorinated polymer (A). The dissolution amount of the fluorinated polymer (A) to the total of the alcohol and the fluorinated polymer (A) is preferably at least 3 mass %, more preferably at least 4 mass %, further preferably at least 5 mass %.

The content of fluorine atoms in the fluorinated polymer (A) is preferably from 50 to 76 mass %. The fluorine atom content being at least 50 mass % is preferred from such a viewpoint that the insulating properties and flame retardancy will be excellent, and the same being at most 76 mass % is preferred from such a viewpoint that the moldability will be excellent. The content of fluorine atoms is more preferably from 55 to 65 mass %. The content of fluorine atoms can be calculated by the $^{19}$F-NMR measurement.

The fluorinated polymer (A) may have groups (F) in side chains of the polymerized units or at the main chain terminals of the polymer molecule, so long as the total number of groups (F) is at least three. When it has groups (F) in side chains of polymerized units, each group (F) preferably has a structure of being bonded to the main chain of the polymer via a single bond or an etheric oxygen atom.

As a polymerized unit having a group (F) in its side chain, a unit represented by the following formula (U1) is preferred:

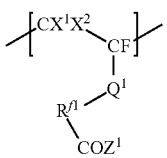
(U1)

(in the formula (U1), $X^1$ and $X^2$ are each independently a hydrogen atom or a fluorine atom, and $Q^1$ is a single bond or an etheric oxygen atom; and —$R^{f1}COZ^1$ corresponds to a group (F).)

Further, when a group (F) is present at a main chain terminal, the group (F) is preferably a group represented by the following formula (F1), a group represented by the following formula (F11), a group represented by the following formula (F12), or the like. Further, as the case requires, a group (F1), a group (F11), a group (F12) or the like may be present in a side chain of a polymerized unit.

—$(R^{f2}O)_k$—$R^{f1}COZ^1$                             (F1)

(in the formula (F1), $R^{f2}$ is a $C_{1-4}$ perfluoroalkylene group; k is an integer of from 1 to 200; and —$R^{f1}COZ^1$ corresponds to a group (F)).

—$CF_2COZ^1$                                                       (F11)

—$CF_2CF_2COZ^1$                                             (F12)

(The types and examples of $Z^1$ in the formulae (F11) and (F12) are the same as those described above for a group (F)).

The fluorinated polymer (A) may be, for example, a fluorinated polymer (A) having at least three of unit(s) (U1) and group(s) (F1) in total. Specifically, a fluorinated polymer (A) having two groups (F1) at the main chain terminals and having one or more units (U1), a fluorinated polymer (A) having one group (F1) at a main chain terminal and having two or more units (U1), or the like may be mentioned. Further, in the above, the fluorinated polymer (A) may be one having a group (F11), a group (F12) or the like, instead of the group (F1) as a group (F) at the main chain terminal.

As the fluorinated polymer (A), preferred may be a fluorinated polymer having at least three units (U1) (hereinafter referred to also as a fluorinated polymer (A1)), a fluorinated polymer having at least three groups (F1) (hereinafter referred to also as a fluorinated polymer (A2)), etc.

<Fluorinated Polymer (A1)>

The fluorinated polymer (A1) may consist only of units (U1) or may consist of units (U1) and units other than units (U1). Hereinafter, each unit constituting the fluorinated polymer (A1) will be described.

In a unit (U1), $Q^1$ is preferably an etheric oxygen atom. $X^1$ and $X^2$ are preferably both fluorine atoms or hydrogen atoms, more preferably both fluorine atoms.

Specific examples of the unit (U1) include the following units.

—[$CF_2$—$CF(COZ^1)$]—,
—[$CF_2$—$CF(CF_2$—$COZ^1)$]—,
—[$CF_2$—$CF((CF_2)_2$—$COZ^1)$]—, —[$CF_2$—$CF(O(CF_2)_2$—$COZ^1)$]—,
—[$CF_2$—$CF(O(CF_2)_3$—$COZ^1)$]—,
—[$CF_2$—$CF(O(CF_2)_4$—$COZ^1)$]—,
—[$CF_2$—$CF(OCF_2CF(CF_3)O(CF_2)_2$—$COZ^1)$]—,
—[$CF_2$—$CF(OCF_2CF(CF_3)O(CF_2)_3$—$COZ^1)$]—,
—[$CF_2$—$CF(O(CF_2)_3O(CF_2)_2$—$COZ^1)$]—,
—[$CF_2$—$CF(O(CF_2)_2O(CF_2)_2$—$COZ^1)$]—,
—[$CH_2$—$CF(CF_2OCF(CF_3)$—$COZ^1)$]—,
—[$CH_2$—$CF(CF_2OCF(CF_3)CF_2OCF(CF_3)$—$COZ^1)$]—.

($Z^1$ is —OH, —$OCH_3$, —$NHNH_2$, —$N(CH_3)NHCH_3$, —NHOH or —$NHOCH_3$.)

For ease of availability, the unit (U1) is particularly preferably —[$CF_2$—$CF(COOCH_3)$]—, —[$CF_2$—$CF(CF_2$—$COOCH_3)$]—, —[$CF_2$—$CF(O(CF_2)_3COOCH_3)$]—, —[$CF_2$—$CF(OCF_2CF(CF_3)O(CF_2)_3COOCH_3)$]—, —[$CF_2$—$CF(O(CF_2)_3CONHNH_2)$]— or —[$CF_2$—$CF(O(CF_2)_3CONHOH)$]—.

The fluorinated polymer (A1) may contain one type of units (U1) alone, or two or more types of units (U1) in combination so long as it has at least three groups (F). From such a viewpoint that the hydrogen-bonding property is higher and the adhesion to the conductor wire is superior, as the fluorinated polymer (A1), a fluorinated polymer containing units (U1) in which $Z^1$ is $NR^1NR^2H$ is preferred. The crosslinking condition, the type of $Z^1$ and the solubility in an alcohol of the fluorinated polymer (A1) are the same as those described above for the fluorinated polymer (A).

Units (U1) in which $Z^1$ is $OR^5$, can be formed by polymerizing a compound represented by the following formula (11) as a monomer. Units (U1) in which $Z^1$ is $NR^1NR^2H$ and $NR^3OR^4$ can be formed by the production process of the fluorinated polymer (A1) as described later.

$CX^1X^2$=$CF$-$Q^1$-$R^{f1}$—$COOR^5$                     (11)

(in the formula (11), $X^1$, $X^2$, $Q^1$, $R^{f1}$ and $OR^5$ are as defined in the formula (U1), and their examples and preferred ranges are also the same.)

Hereinafter, as shown in the following formulae (U1a), (U1b) and (U1c), a unit (U1) in which $Z^1$ is $OR^5$ will be referred to as a unit (U1a), a unit (U1) in which $Z^1$ is $NR^1NR^2H$ will be referred to as a unit (U1 b), and the unit (U1) in which $Z^1$ is $NR^3OR^4$ will be referred to as a unit (U1c).

(U1a)

(U1b)

(U1c)

(in the formulae (U1a), (U1b) and (U1c), $X^1$, $X^2$, $Q^1$, $R^{f1}$, $R^1$, $R^2$, $R^3$, $R^4$ and $R^5$ are as defined in the formula (U1), and their examples and preferred ranges are also the same.).

The fluorinated polymer (A1) may further have fluoroethylene units (hereinafter referred to also as "units (U2)"), units represented by the formula (U3) as described later (hereinafter referred to also as "units (U3)") and other units (hereinafter referred to also as "units (U4)").

<Units (U2)>

Specific examples of units (U2) include units derived from tetrafluoroethylene ($CF_2=CF_2$) (TFE), trifluoroethylene ($CF_2=CHF$) (TrFE), chlorotrifluoroethylene ($CFCl=CF_2$), vinylidene fluoride ($CF_2=CH_2$), etc. From the viewpoint of excellent light resistance, TFE units, TrFE units and chlorotrifluoroethylene units are preferred. TFE units are particularly preferred from the viewpoint of excellent adhesiveness to the substrate since highly polar $—COZ^1$ groups tend to be present at the interface. TrFE units and chlorotrifluoroethylene units are particularly preferred from such a viewpoint that the crystallinity of the fluorinated polymer will not be as high as that of TFE units, light scattering is less likely to occur, and transparency is high. TrFE units are particularly preferred from the viewpoint of excellent solubility in an alcohol.

The fluorinated polymer may contain one type of units (U2) alone, or two or more types of units (U2) in combination.

<Units (U3)>

A unit (U3) is a unit represented by the following formula (U3) (but excluding a fluoroethylene unit).

$$—[CX^3X^4—CY^1Y^2]—\quad(U3)$$

(in the formula (U3), $X^3$ and $X^4$ are each independently a hydrogen atom, a fluorine atom or a chlorine atom, $Y^1$ is a hydrogen atom, a fluorine atom or a chlorine atom, and $Y^2$ is a hydrogen atom, a fluoroalkyl group, a fluoroalkyl group with at least two carbon atoms having an etheric oxygen atom between carbon-carbon atoms, a fluoroalkoxy group, a fluoroalkoxy group with at least two carbon atoms having an etheric oxygen atom between carbon-carbon atoms, a fluoroalkenyl group, or a fluoroalkenyl group with at least two carbon atoms having an etheric oxygen atom between carbon-carbon atoms.).

As the fluoroalkyl group in $Y^2$, the number of carbon atoms is preferably from 1 to 15, particularly preferably from 1 to 6. From the viewpoint of excellent thermal stability, a perfluoroalkyl group is preferred; a $C_{1-6}$ perfluoroalkyl group is more preferred; and $—CF_3$ is particularly preferred. As the fluoroalkyl group with at least two carbon atoms having an etheric carbon atom between carbon-carbon atoms in $Y^2$, the number of carbon atoms is preferably from 2 to 15, particularly preferably from 2 to 6. From the viewpoint of excellent thermal stability, a perfluoroalkyl group with at least two carbon atoms having an etheric oxygen atom between carbon-carbon atoms is preferred; a $C_{2-6}$ perfluoroalkyl group having an etheric oxygen atom between carbon-carbon atoms is particularly preferred.

As the fluoroalkoxy group in $Y^2$, the number of carbon atoms is preferably from 1 to 15, particularly preferably from 1 to 6. From the viewpoint of excellent thermal stability, a $C_{1-6}$ perfluoroalkoxy group is preferred, and $—OCF_3$, $—OCF_2CF_3$, $—O(CF_2)_2CF_3$ or $—O(CF_2)_3CF_3$ is particularly preferred. As the fluoroalkoxy group with at least two carbon atoms having an etheric oxygen atom between carbon-carbon atoms in $Y^2$, the number of carbon atoms is preferably from 2 to 15, more preferably from 2 to 6. From the viewpoint of excellent thermal stability, a perfluoroalkoxy group with at least two carbon atoms having an etheric oxygen atom between carbon-carbon atoms is preferred, and a $C_{2-6}$ perfluoroalkoxy group having an etheric oxygen atom between carbon-carbon atoms is particularly preferred.

As the fluoroalkenyl group in $Y^2$, the number of carbon atoms is preferably from 5 to 15 from such a viewpoint that cyclization will not proceed within the molecules and the synthesis will be easy. From the viewpoint of excellent thermal stability, a perfluoroalkenyl group is preferred, and $—(CF_2)_4CF=CF_2$, $—(CF_2)_5CF=CF_2$ or $—(CF_2)_6CF=CF_2$ is particularly preferred. As the fluoroalkenyl group with at least two carbon atoms having an etheric oxygen atom between carbon-carbon atoms in $Y^2$, the number of carbon atoms is preferably from 2 to 15, particularly preferably from 2 to 6. From the viewpoint of excellent thermal stability, a perfluoroalkenyl group with at least two carbon atoms having an etheric oxygen atom between carbon-carbon atoms is preferred, and a $C_{2-6}$ perfluoroalkenyl group having an etheric oxygen atom between carbon-carbon atoms is particularly preferred.

As specific examples of the unit (U3), the following units may be mentioned.

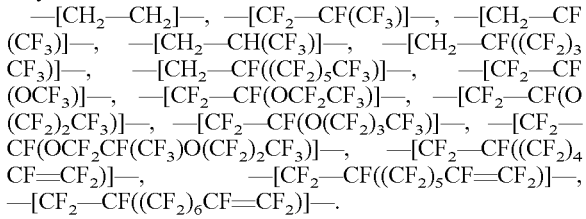

$—[CH_2—CH_2]—$, $—[CF_2—CF(CF_3)]—$, $—[CH_2—CF(CF_3)]—$, $—[CH_2—CH(CF_3)]—$, $—[CH_2—CF((CF_2)_3CF_3)]—$, $—[CH_2—CF((CF_2)_5CF_3)]—$, $—[CF_2—CF(OCF_3)]—$, $—[CF_2—CF(OCF_2CF_3)]—$, $—[CF_2—CF(O(CF_2)_2CF_3)]—$, $—[CF_2—CF(O(CF_2)_3CF_3)]—$, $—[CF_2—CF(OCF_2CF(CF_3)O(CF_2)_2CF_3)]—$, $—[CF_2—CF((CF_2)_4CF=CF_2)]—$, $—[CF_2—CF((CF_2)_5CF=CF_2)]—$, $—[CF_2—CF((CF_2)_6CF=CF_2)]—$.

The unit (U3) is preferably $—[CH_2—CH_2]—$, $—[CF_2—CF(CF_3)]—$, $—[CF_2—CF(OCF_3)]—$, $—[CF_2—CF(O(CF_2)_2CF_3]—$ or $—[CF_2—CF(OCF_2CF(CF_3)O(CF_2)_2CF_3]—$, since the fluorinated polymer (A1) will have a low glass transition temperature, will be excellent in fluidity, and will be excellent in formability, and at the time of curing it by at least one of heating and active-energy-ray irradiation, the mobility will be high and the crosslinking reaction between molecules tends to readily proceed.

The fluorinated polymer may contain one type of units (U3) alone, or two or more types of units (U3) in combination.

Units (U3) can be formed by polymerizing a compound (31) as a monomer.

$$CX^3X^4=CY^1Y^2\quad(31)$$

(in the formula (31), $X^3$, $X^4$, $Y^1$ and $Y^2$ are as defined in the formula (U3), and their examples and preferred ranges are also the same.)

Units (U4) may be units derived from e.g. propylene, isobutene, 2-trifluoromethyl-3,3,3-trifluoro-1-propene, etc.

Preferred Embodiments of Fluorinated Polymer (A1)

The number of groups (F) in the fluorinated polymer (A1) is preferably at least three from the viewpoint of the excellent crosslinking reactivity of groups (F) one another, and should better be small when the molecular weight of the fluorinated polymer (A1) is large and should better be large when the molecular weight of the fluorinated polymer (A1) is small. Usually, from 3 to 100 are preferred, and from 3 to 30 are more preferred. Here, the number of groups (F) in the fluorinated polymer (A1) is an average number per molecule. The number of groups (F) possessed by the fluorinated polymer (A1) (in the case where no group (F) is present at the main chain terminals) corresponds to the number of units (U1) possessed by the fluorinated polymer (A1). $Z^1$ in groups (F) of the fluorinated polymer (A1) is preferably composed of a single kind of groups or composed of two kinds of $NR^1NR^2H$ and $OR^5$. That is, units (U1) in the fluorinated polymer (A1) are preferably composed of one kind of unit (U1a), unit (U1b) or unit (U1c), or two kinds of unit (U1a) and unit (U1b).

When units (U1) in the fluorinated polymer (A1) are composed of two kinds of unit (U1a) and unit (U1b), the unit (U1b) is preferably from 1 to 90 mol %, more preferably from 5 to 70 mol %, particularly preferably from 10 to 60 mol %, to the total of the unit (U1a) and the unit (U1b), in consideration of the solubility in an alcohol of the fluorinated polymer (A1), suppression of foaming during the curing, the crosslinking density of the obtainable cured product, etc.

The mass average molecular weight of the fluorinated polymer (A1) is preferably 1,000 to 1,000,000. The mass average molecular weight is more preferably at least 3,000, since volatile components will be less. The mass average molecular weight is more preferably at most 100,000, since it will be excellent in solubility. When the mass average molecular weight of the fluorinated polymer (A1) is from 1,000 to 15,000, the viscosity is from 1 to 1,000 Pa·s, and by heating at from 25 to 100° C., the viscosity becomes at most 10 Pa·s, whereby a curing agent composition containing the fluorinated polymer (A1) can be coated on a conductor wire without using a solvent. The fluorine atom content in the fluorinated polymer (A1) is the same as that described for the fluorinated polymer (A).

The mass average molecular weight can be obtained as the molecular weight calculated as PMMA (polymethylmethacrylate) by gel permeation chromatography (GPC). In this specification, the mass average molecular weight is one obtained by the above method unless otherwise specified.

The viscosity can be obtained by a rotary viscometer at 25° C. In this specification, the viscosity is one obtained by the above method unless otherwise specified.

The content of units (U1) in the fluorinated polymer (A1) is preferably from 0.02 to 7.1 mmol/g, more preferably from 0.1 to 4 mmol/g, further preferably from 0.1 to 3 mmol/g, particularly preferably from 0.2 to 1 mmol/g, to the mass of the fluorinated polymer (A1), in view of the solubility in an alcohol of the fluorinated polymer (A1), suppression of foaming during the curing, the crosslinking density of the obtainable cured product, etc.

When units (U1) consist only of units (U1b) in which $Z^1$ is $NR^1NR^2H$, the content of units (U1b) to the mass of the fluorinated polymer (A1) is preferably from 0.02 to 4 mmol/g, more preferably from 0.02 to 1 mmol/g, particularly preferably from 0.2 to 0.5 mmol/g, in consideration of the solubility in an alcohol of the fluorinated polymer (A1), suppression of foaming during the curing, the crosslinking density of the obtainable cured product, etc.

When units (U1) consist only of units (U1c) in which $Z^1$ is $NR^3OR^4$, the content of the units (U1c) to the mass of the fluorinated polymer (A1) is preferably from 0.1 to 4 mmol/g, more preferably from 0.2 to 3 mmol/g, particularly preferably from 0.3 to 1 mmol/g, in consideration of the solubility in an alcohol of the fluorinated polymer (A1), suppression of foaming during the curing, the crosslinking density of the obtainable cured product, etc.

When units (U1) consist only of units (U1a) in which $Z^1$ is $OR^5$, the content of units (U1a) to the mass of the fluorinated polymer (A1) is preferably from 0.1 to 4 mmol/g, more preferably from 0.1 to 3 mmol/g, particularly preferably from 0.3 to 1 mmol/g, in consideration of suppression of foaming during the curing, the crosslinking density of the obtainable cured product, etc.

The contents of units (U1a) to units (U1c) in the fluorinated polymer (A1) can be calculated by the $^{19}$F-NMR measurements.

The proportion of units (U1) in all units of the fluorinated polymer (A1) is preferably from 1 to 100 mol %, more preferably from 3 to 98 mol %, further preferably from 3 to 50 mol %, particularly preferably from 5 to 15 mol %, in consideration of the solubility in an alcohol of the fluorinated polymer (A1), suppression of foaming during the curing, the crosslinking density of the obtainable cured product, etc.

A preferred embodiment of the fluorinated polymer (A1) is a fluorinated polymer comprising units (U1), units (U2) and units (U3), wherein in all units of the fluorinated polymer (A1), the proportion of units (U1) is from 1 to 98 mol %, the proportion of units (U2) is from 1 to 95 mol %, and the proportion of units (U3) is from 1 to 95 mol %.

The contents of units (U1) to units (U4) in the fluorinated polymer (A1) can be calculated by the $^{19}$F-NMR and $^1$H-NMR measurements.

[Method for Producing Fluorinated Polymer (A1)]

For example, when units (U1) consist only of units (U1a), a fluorinated polymer (A1) is obtainable by polymerizing a monomer (11) and optional monomers such as fluoroethylene, a monomer (31), etc. by a known method (e.g. the method disclosed in WO2015/098773) by using them so that units (U1a), units (U2), units (U3), etc. derived from the respective monomers will be in the desired proportions in the obtainable fluorinated polymer (A1).

As the polymerization method, a known polymerization method such as suspension polymerization, solution polymerization, emulsion polymerization or bulk polymerization may be mentioned. Solution polymerization is preferred from such a viewpoint that it is easy to control the molecular weight, e.g. the mass average molecular weight, to a predetermined degree. As a solvent for solution polymerization, a fluorinated solvent as described later is preferred.

A fluorinated polymer (A1) in which units (U1) consist of units (U1a) and units (U1b) or units (U1) consist only of units (U1b), can be produced, for example, by a method in which a fluorinated polymer (A1) containing units (U1a) obtained as described above and a hydrazine compound represented by the following formula (5) (hereinafter simply referred to also as a "hydrazine compound") are reacted to modify some or all of the units (U1a) to units (U1b).

$$HR^1N\text{—}NR^2H \qquad (5)$$

(in the formula (5), $R^1$ and $R^2$ are as defined in the formula (U1), and their examples and preferred ranges are also the same.)

The hydrazine compound may be hydrazine, methylhydrazine or 1,2-dimethylhydrazine. The hydrazine compound may be used in the form of a hydrate such as hydrazinemonohydrate. Hereinafter, a "hydrazine compound" is used as a term including a hydrate of a hydrazine compound. As the hydrazine compound, hydrazine monohydrate is preferred from the viewpoint of the safety and the solubility in an alcohol of the obtainable fluorinated polymer (A1). The state of the hydrazine compound to be subjected to the reaction may be in the form of an aqueous solution or a salt. An aqueous solution is more preferred. As the hydrazine compound, a commercial product may be used.

The proportion for modification of units (U1a) to units (U1b) may be adjusted by the amount of the hydrazine compound used to the units (U1a) in the fluorinated polymer (A1) containing the units (U1a) used as a raw material. In the obtainable fluorinated polymer (A1), the content of units in which $Z^1$ is $NR^1NR^2H$ can be measured by quantifying the remaining —$COOR^5$ groups by infrared spectroscopy (IR).

Specifically, the amount of the hydrazine compound to be used is preferably from 0.1 to 20 mol, more preferably from 0.3 to 15 mol, particularly preferably from 0.5 to 10 mol, to 1 mol of the groups represented by —COOR⁵ in the fluorinated polymer (A1) containing units (U1a), although it is not particularly limited so long as a fluorinated polymer (A1) having the desired proportion of units (U1a) modified to units (U1 b) is obtainable. Here, in order to let all of units (U1a) be modified to units (U1b), it is preferred to use from 3 to 20 mol of the hydrazine compound per mol of the groups represented by —COOR⁵.

The reaction can be carried out in the presence of a solvent. As the solvent, a solvent capable of dissolving raw material components (a fluorinated polymer (A1) containing units (U1a), a hydrazine compound) is preferred. A solvent in which at least a fluorinated polymer (A1) containing units (U1a) is soluble is preferred. As the solvent, a fluorinated solvent, an ether-type solvent or an ester-type solvent may be mentioned, and the solvent may be appropriately selected according to the polarity of the raw material components, etc. As the solvent, one type may be used alone, or two or more types may be used in combination. Further, it is also preferred to use such a solvent and an alcohol as mixed. It is also possible to add an alcohol as the reaction proceeds. Here, as the alcohol, one described in the section for the fluorinated polymer (A) may be used.

The fluorinated solvent contains fluorine and carbon, and may further contain chlorine, oxygen and hydrogen. For example, a fluorinated alkane, a fluorinated aromatic compound, a fluoroalkyl ether, a fluorinated alkylamine, a fluoroalcohol, etc. may be mentioned.

As a fluorinated alkane, a compound having from 4 to 8 carbon atoms is preferred. Commercially available products may, for example, be $CF_3CH_2CF_2H$ (HFC-245fa), $CF_3CH_2CF_2CH_3$ (HFC-365mfc), perfluorohexane, 1H-perfluorohexane, perfluorooctane, $C_6F_{13}H$ (manufactured by Asahi Glass Co., Ltd., Asahiklin (registered trademark) AC-2000), $C_6F_{13}C_2H_5$ (manufactured by Asahi Glass Co., Ltd., Asahiklin (registered trademark) AC-6000), $C_2F_5CHFCHFCF_3$ (manufactured by Chemers, Bartrell (registered trademark) XF), etc.

As the fluorinated aromatic compound, hexafluorobenzene, trifluoromethylbenzene, perfluorotoluene, bis(trifluoromethyl)benzene, etc. may be mentioned. As the fluoroalkyl ether, a $C_{4-12}$ compound is preferred. Commercially available products may, for example, be $CF_3CH_2OCF_2CF_2H$ (manufactured by Asahi Glass Co., Ltd., Asahiklin (registered trademark) AE-3000), $C_4F_9OCH_3$ (manufactured by 3M, Novec (registered trademark) 7100), $C_4F_9OC_2H_5$ (manufactured by 3M, Novec (registered trademark) 7200), $C_2F_5CF(OCH_3)C_3F_7$ (manufactured by 3M, Novec (registered trademark) 7300), etc.

As the fluorinated alkylamine, perfluorotripropylamine, perfluorotributylamine, etc. may be mentioned. As the fluoroalcohol, 2,2,3,3-tetrafluoropropanol, 2,2,2-trifluoroethanol, hexafluoroisopropanol, etc. may be mentioned. As other examples, dichloropentafluoropropane (HCFC-225), perfluoro(2-butyltetrahydrofuran), etc. may be mentioned. Dichloropentafluoropropane is commercially available from Asahiklin (registered trademark) AK-225 series (manufactured by Asahi Glass Co., Ltd.) such as AK-225G.

As the ether-type solvent, ethylene glycol dimethyl ether, ethylene glycol diethyl ether, diethylene glycol dimethyl ether, diisopropyl ether, ethylene glycol monomethyl ether, ethylene glycol monoethyl ether, ethylene glycol monobutyl ether, propylene glycol monomethyl ether, propylene glycol dimethyl ether, etc. may be mentioned.

As the ester-type solvent, methyl acetate, ethyl acetate, n-propyl acetate, isopropyl acetate, n-butyl acetate, isobutyl acetate, etc. may be mentioned.

The reaction may be carried out, for example, by dissolving a fluorinated polymer (A1) containing units (U1a) in the above-mentioned solvent and adding a hydrazine compound at from 0 to 30° C. After the addition, the mixture is heated to from 30 to 100° C. and reacted for from 1 minute to 10 hours to obtain the desired fluorinated polymer (A1) containing units (U1 b).

A fluorinated polymer (A1) in which units (U1) consist of units (U1a) and units (U1c), or units (U1) consist only of units (U1c), can be produced, for example, by a method in which a fluorinated polymer (A1) containing units (U1a) obtainable as described above and a hydroxylamine compound represented by the following formula (6) (hereinafter simply referred to also as a "hydroxylamine compound") are reacted to modify some or all of the units (U1a) to units (U1c).

$$NHR^3OR^4 \qquad (6)$$

(in the formula (6), $R^3$ and $R^4$ are as defined in the formula (U1), and their examples and preferred ranges are also the same.)

As the hydroxylamine compound, hydroxylamine, N-methylhydroxylamine, N,O-dimethylhydroxylamine or isopropylhydroxylamine may be mentioned, and hydroxylamine is preferred from the viewpoint of better solubility in an alcohol of the obtainable fluorinated polymer (A1). The hydroxylamine compound to be subjected to the reaction may be in the form of an aqueous solution or a salt. An aqueous solution is preferred from the viewpoint of safety. As the hydroxylamine compound, a commercial product may be used.

A method for producing a fluorinated polymer (A1) containing units (U1c) by reacting the fluorinated polymer (A1) containing units (U1a) and the hydroxylamine compound to modify some or all of the unit (U1a) to unit (U1c) may, for example, be the same method as the above-described method for producing the fluorinated polymer (A 1) containing units (U1 b), except that the hydrazine compound is changed to the hydroxylamine compound. Also in this case, the content of units in which $Z^1$ is $NR^3OR^4$ can be measured by quantifying the remaining —COOR⁵ groups by infrared spectroscopy (IR).

Further, in a case where a fluorinated polymer (A1) contains all of units (U1a), units (U1b) and units (U1c), the following may specifically be mentioned as methods for producing such a fluorinated polymer (A1).

(a) A fluorinated polymer (A1) containing units (U1a) and the hydrazine compound are reacted, and then the hydroxylamine compound is reacted.

(b) A fluorinated polymer (A1) containing units (U1a) and the hydroxylamine compound are reacted, and then the hydrazine compound is reacted.

(c) A fluorinated polymer (A1) containing units (U1a), the hydroxylamine compound and the hydrazine compound are reacted.

However, in the above (a) to (c), the amounts of the hydrazine compound and the hydroxylamine compound to be used are adjusted to meet the proportions of units (U1a), units (U1b) and units (U1c) in the desired fluorinated polymer (A1).

Further, in the above (a) to (c), by adjusting the amounts of the hydrazine compound and the hydroxylamine compound, it is possible to produce a fluorinated polymer (A1) having only units (U1b) and units (U1c) as the units (U1).

<Fluorinated Polymer (A2)>

The fluorinated polymer (A2) is a fluorinated polymer having at least three groups (F1) as groups (F).

$$—(R^{f2}O)_k—R^{f1}COZ^1 \quad (F1)$$

(in the formula (F1), $R^{f2}$ is a $C_{1-4}$ perfluoroalkylene group; k is an integer of from 1 to 200; and $—R^{f1}COZ^1$ corresponds to a group (F)).

$R^{f2}$ in the group (F1) being a $C_{1-4}$ perfluoroalkylene group specifically means that $—(R^{f2}O)_k—$ is $—(C_aF_{2a}O)_k—$ (a is an integer of from 1 to 4, k is an integer of from 1 to 200, and the respective $—C_aF_{2a}O—$ units may be the same or different).

The $—C_aF_{2a}O—$ unit may be linear or branched and may, for example, be $—CF_2CF_2CF_2CF_2O—$, $—CF_2CF_2CF_2O—$, $—CF(CF_3)CF_2O—$, $—CF_2CF_2O—$ or $—CF_2O—$. k may suitably be adjusted depending on the desired molecular weight. A preferred range of k is from 2 to 100.

$R^{f2}$ may be a combination of a plurality of units, and in such a case, the respective units may be present in block, alternating or randomly.

Specifically, $—(R^{f2}O)_k—$ may be $—(CF_2CF_2CF_2O)_{k1}—(CF_2CF_2CF_2O)_{k2}—(CF(CF_3)CF_2O)_{k3}-(CF_2CF_2O)_{k4}-(CF_2O)_{k5}—$ (where k1, k2, k3, k4 and k5 are each independently an integer of 0 or more; the sum of k1, k2, k3, k4 and k5 is from 1 to 200, and the respective repeating units may be present in block, alternating or randomly.

$R^{f2}$ is preferably $\{(CF_2O)_{k11}(CF_2CF_2O)_{k12}\}$, $(CF_2CF_2O)_{k13}$ or $(CF_2CF_2CF_2O)_{k14}$, more preferably $\{(CF_2O)_{k11}(CF_2CF_2O)_{k12}\}$ or $(CF_2CF_2O)_{k13}$. Here, k11 is an integer of at least 1, k12 is an integer of at least 1, k11+k12 is an integer of from 2 to 200, and the bonding order of k11 $CF_2O$ and k12 $CF_2CF_2O$ is not limited. Each of k13 and k14 is an integer of from 1 to 200.

Specific examples of the group (F1) include the following groups.

$—(CF_2O)_{k11}(CF_2CF_2O)_{k12}—CF_2—COZ^1$,
$—(CF_2O)_{k11}(CF_2CF_2)_{k12}—(CF_2)_2—COZ^1$,
$—(CF_2O)_{k11}(CF_2CF_2O)_{k12}—(CF_2)_3—COZ^1$,
$—(CF_2C F_2O)_{k13}—CF_2—COZ^1$,
$—(CF_2C F_2O)_{k13}—(CF_2)_2—COZ^1$,
$—(CF_2CF_2CF_2O)_{k14}—(CF_2)_2—COZ^1$,
$—(CF_2CF_2CF_2O)_{k14}—(CF_2)_3—COZ^1$, ($Z^1$ is $—OH$, $—OCH_3$, $—OC_2H_5$, $—NHNH_2$, $—N(CH_3)NHCH_3$, $—NHOH$ or $—NHOCH_3$. k11, k12, k13 and k14 are the same as defined above.)

In $—(CF_2O)_{k11}(CF_2CF_2O)_{k12}$, it is preferred that k11 is from 1 to 50, k12 is from 3 to 149, and k11+k12 is from 5 to 150, and it is more preferred that k11 is from 1 to 10, k12 is from 10 to 99, and k11+k12 is from 15 to 100. In $—(CF_2CF_2O)_{k13}$, k13 is preferably from 5 to 150, more preferably from 15 to 100. In $—(CF_2CF_2CF_2O)_{k14}$, k14 is preferably from 5 to 150, more preferably from 15 to 100.

The fluorinated polymer (A2) may contain one type of groups (F1) alone or two or more types of groups (F1) in combination so long as it has at least three groups (F1). From such a viewpoint that the hydrogen-bonding property will be higher and the adhesion to the conductor wire will be superior, the fluorinated polymer (A2) is preferably a fluorinated polymer containing groups (F1) in which Z' is $NR'NR^2H$. The crosslinking conditions, the type of $Z^1$ and the solubility in an alcohol of the fluorinated polymer (A2), are the same as those described above for the fluorinated polymer (A).

Hereinafter, as shown in the following formulae (F1a), (F1b) and (F1c), a group (F1) in which $Z^1$ is $OR^5$ will be referred to as a group (F1a), a group (F1) in which $Z^1$ is $NR^1NR^2H$ will be referred to as a group (F1 b), and a group (F1) in which $Z^1$ is $NR^3OR^4$ will be referred to as a group (F1c).

$$—(R^{f2}O)_k—R^{f1}COOR^5 \quad (F1a)$$

$$—(R^{f2}O)_k—R^{f1}CONR^1NR^2H \quad (F1b)$$

$$—(R^{f2}O)_k—R^{f1}CONR^3OR^4 \quad (F1c)$$

It is preferred that at least three groups (F1) possessed by a fluorinated polymer (A2) are composed of one type of groups from such a viewpoint that the production of the fluorinated polymer (A2) will be simple, the uniformity of the curing reaction in the curable composition will be excellent, etc. Alternatively, a combination of two types of groups that react with each other is also preferred. Specifically, it is preferred that all groups (F1) in the fluorinated polymer (A2) consist of one type of groups (F1a), groups (F1b) or groups (F1c), or a combination of two types of groups (F1a) and groups (F1b).

As the fluorinated polymer (A2), for example, a compound represented by the following formula (A2a) may be mentioned.

$$(F1-)_nY^3(—F2)_m \quad (A2a)$$

F1: a group represented by the formula (F1). n is an integer of at least 3.

$Y^3$: a (n+m) valent perfluorinated saturated hydrocarbon group, a (n+m) valent perfluorinated saturated hydrocarbon group having an etheric oxygen atom interposed between carbon-carbon atoms, or a (n+m) valent carbon skeleton in which an etheric oxygen atom may be interposed between carbon-carbon atoms, but no $—OCF_2O$-structure is present in such a group. n+m is an integer of from 3 to 20.

F2: a group represented by the following formula (F2). m is an integer of 0 or more.

$$R^{f3}—(CF_2CF_2CF_2CF_2O)_{k1}—(CF_2CF_2CF_2)_{k2}—(CF(CF_3)CF_2)_{k3}— \quad (F2)$$

(in the formula (F2), k1, k2 and k3 are as described in the above specific examples of $—(R^{f2}O)_k—$; $R^{f3}$ is a $C_{1-20}$ perfluoroalkyl group, a $C_{1-20}$ perfluoroalkoxy group, a $C_{2-20}$ perfluoroalkyl group having an etheric oxygen atom between carbon-carbon atoms (but no $—OCF_2O—$ structure is present in such a group), or a $C_{2-20}$ perfluoroalkoxy group having an etheric oxygen atom between carbon-carbon atoms (but no $—OCF_2O$-structure is present in such a group).

The number of carbons in $Y^3$ is preferably from 1 to 50, more preferably from 1 to 20, and further preferably from 1 to 5. As $Y^3$, for example, groups represented by the following (a) to (g) may be mentioned. The valence of $Y^3$ is represented by (n+m) valence and is an integer of from 3 to 20. The value of (n+m) is preferably from 3 to 6.

(a)

(b)

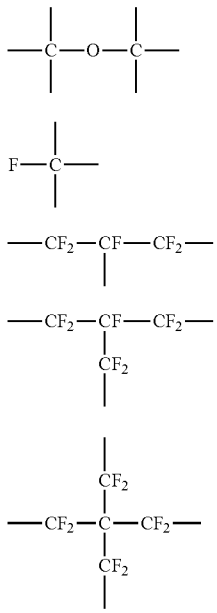

As $R^{f3}$, a straight chain structure, a branched structure, a ring structure or a structure having a partial ring structure may be mentioned; a straight chain structure or a branched structure is preferred; and a straight chain structure is particularly preferred. A perfluoroalkyl group or a perfluoroalkoxy group is preferred; and a perfluoroalkoxy group is more preferred. The number of carbons in $R^r$ is more preferably from 1 to 10, particularly preferably from 1 to 6. Specifically, a trifluoromethoxy group, a heptafluoropropyloxy group, a tridecafluorohexyloxy group, etc. may be mentioned. Since the fluorinated polymer (A2a) has F2, it is possible, for example, to suppress foaming at the time of the curing, or to adjust the crosslinking density of the obtainable cured product. The ratio of m to n+m in the fluorinated polymer (A2a) is preferably from 0 to 0.5.

In the fluorinated polymer (A2a), n indicating the number of groups (F1) is not particularly limited so long as it is at least 3. Groups (F1) may be attached to all of the bonds of $Y^3$. For example, when $Y^3$ is a group (a), the number of groups (F1) may be 3 or 4. The fluorinated polymer (A2a) is preferably a compound in which $Y^3$ is a group (a) and the number n of groups (F1) is 4, from the viewpoint of excellent crosslinking efficiency.

The mass average molecular weight of the fluorinated polymer (A2) is preferably 1,000 to 20,000. The mass average molecular weight is more preferably at least 3,000, because evaporation components will be less. The mass average molecular weight is more preferably at most 10,000, because the polymer will be excellent in solubility. When the mass average molecular weight of the fluorinated polymer (A2) is from 1,000 to 5,000, the viscosity will be from 1 to 100 Pa·s and becomes at most 10 Pa·s when heated at from 25 to 100° C., whereby a curing agent composition containing the fluorinated polymer (A1) can be coated on a conductor wire without using a solvent. The fluorine atom content in the fluorinated polymer (A2) is the same as that described for the fluorinated polymer (A).

[Method for Producing Fluorinated Polymer (A2)]

The fluorinated polymer (A2) can be produced, for example, by synthesizing $Y^3[(R^{f2}O)_k-R^{f1}COF]_n$ as a fluorinated polymer (A2a) in which groups (F1) are groups (F1a) by a known method (for example, the method disclosed in Japanese Patent No. 5,028,801), and then esterifying it or esterifying it followed by hydrolysis.

The fluorinated polymer (A2a) in which groups (F1) consist of groups (F1a) and groups (F1b) or in which groups (F1) consist only of groups (F1b) can be produced, for example, by a method in which a fluorinated polymer (A2a) containing groups (F1a) obtained as described above and a hydrazine compound are reacted to modify some or all of the groups (F1a) to groups (F1b).

Specifically, a fluorinated polymer (A2a) in which groups (F1) consist of groups (F1a) and groups (F1b), or groups (F1) consist only of groups (F1b), can be produced by a method similar to the method of modifying some or all of units (U1a) of the fluorinated polymer (A1) containing the units (U1a) with a hydrazine compound, to units (U1b) in the above description. However, in the fluorinated polymer (A2a), the reaction temperature is preferably in the range of from 10 to 100° C.

The fluorinated polymer (A2a) in which groups (F1) consist of groups (F1a) and groups (F1c), or groups (F1) consist only of groups (F1c), can be produced, for example, by a method in which a fluorinated polymer (A2a) containing groups (F1a) obtained as described above is reacted with a hydroxylamine compound to modify some or all of the groups (F1a) to groups (F1c).

Specifically, a fluorinated polymer (A2a) in which groups (F1) consist of group (F1a) and groups (F1c), or groups (F1) consist only of groups (F1c), can be produced by a method similar to the method in which some or all of units (U1a) in the fluorinated polymer (A1) containing the units (U1a) are modified by a hydroxylamine compound to units (U1c) in the above description. However, in the fluorinated polymer (A2a), the reaction temperature is preferably in the range of from 10 to 100° C.

[Curable Composition]

The covering layer in the electric wire of the present invention is made of a cured product of a curable composition containing a fluorinated polymer (A). The curable composition may consist solely of the fluorinated polymer (A). As the fluorinated polymer (A), one type may be used alone, or two or more types may be used in combination. When two or more types are to be combined, a combination of two or more types of the fluorinated polymer (A1), a combination of two or more types of the fluorinated polymer (A2), a combination of the fluorinated polymer (A1) and the fluorinated polymer (A2), etc. may be mentioned. The content of the fluorinated polymer (A) in the curable composition is preferably from 10 to 100 mass %, more preferably from 50 to 100 mass %, to the total amount of the curable composition.

The curable composition may contain, in addition to the fluorinated polymer (A), other reactive components so long as the crosslinking reaction of the fluorinated polymer (A) is not impaired. Other reactive components may be a fluorinated polymer having one or two groups (F), a silane coupling agent for improving the adhesion to a conductive wire, etc. The silane coupling agent may, for example, be one described in WO2015/098773.

The content of other reactive components in the curable composition is preferably from 0.01 to 50 mass %, more preferably from 0.1 to 10 mass %, to the total amount of the curable composition.

The curable composition may further contain non-reactive components. Non-reactive components include an inorganic filler, a fluoropolyether compound, a perfluoro resin such as polytetrafluoroethylene (manufactured by Asahi Glass Co. Ltd., Fluon (registered trademark) PTFE Fine Powder), a partially fluorinated resin such as an ethylene/tetrafluoroethylene copolymer (manufactured by Asahi Glass Co. Ltd., Fluon (registered trademark) ETFE Powder), an organic pigment, etc.

As the inorganic filler, metal oxide particles such as silica, titania, zirconia, alumina, etc., glass fibers, carbon fibers, various inorganic pigments, etc. are preferred. The largest diameter of the inorganic filler is not particularly limited, but is preferably from 0.1 to 1,000 µm, because the filler will be easily dispersed in the covering layer. The content of the inorganic filler is preferably from 20 to 200 parts by mass, particularly preferably from 50 to 100 parts by mass, to 100 parts by mass of the fluorinated polymer (A). When the content of the inorganic filler is at least the lower limit value in the above range, the hardness will be further increased. When it is at most the upper limit value in the above range, the moldability will be excellent.

The content of the non-reactive components other than the inorganic filler in the curable composition is preferably from 10 to 90 mass %, more preferably from 30 to 70 mass %, to the total amount of the curable composition.

In the production of an electric wire, the curable composition may be used as it is, to cover the outer periphery of the conductor wire to form a precursor layer made of the curable composition. From the viewpoint of the working efficiency, it is preferred to prepare a coating composition comprising the curable composition and a solvent, and to form a precursor layer using the coating composition. Then, the precursor layer is cured to obtain a covering layer, whereby an electric wire is produced.

[Coating Composition]

The coating composition is a liquid composition comprising the curable composition and a solvent that dissolves or disperses the curable composition. By the use of the coating composition, formation of a precursor layer on the outer periphery of the conductor wire will be facilitated, whereby the productivity will be improved. When the coating composition is used, a coating film made of the coating composition is formed on the outer periphery of the conductor wire, and then the solvent is removed from the coating film, whereby a precursor layer made of the curable composition is obtainable.

As the solvent to be used for the coating composition, a solvent having a function of sufficiently dissolving or dispersing the curable composition is preferred. The solvent preferably contains a liquid having a boiling point of at most 250° C. (hereinafter referred to as "liquid (L)") from the viewpoint of ease of removal. As the liquid (L), an alcohol having a boiling point of at most 250° C. and one having a boiling point of at most 250° C. among compounds exemplified as the solvent for producing a fluorinated polymer (A) (but excluding an alcohol) are preferred. As the solvent, one type may be used alone, or two or more types may be used in combination. When two or more types of liquid (L) having different boiling points are used, the foaming of the cured product will be easily suppressed satisfactorily.

The content of the curable composition in the coating composition is preferably from 0.1 to 99 mass %, more preferably from 1 to 70 mass %, particularly preferably from 5 to 60 mass %. The content of the solvent in the coating composition is preferably from 99.9 to 1 mass %, more preferably from 99 to 30 mass %, particularly preferably from 95 to 40 mass %. The content of the liquid (L) in the solvent is preferably from 50 to 100 mass %, particularly preferably from 70 to 100 mass %.

[Method for Producing Electric Wire]

The method for producing an electric wire in the present invention is a method for producing an electric wire comprising a conductor wire and a covering layer covering the outer periphery of the conductor wire, and comprises the following steps (1) and (2).

(1) The outer periphery of the conductor wire is covered with a curable composition containing a fluorinated polymer containing at least three groups (F), to form a precursor layer (hereinafter referred to also as a "precursor layer forming step").

(2) Heat is applied and/or active energy rays are irradiated to the precursor layer obtained in the above (1) to obtain a covering layer made of a cured product of the above-mentioned curable composition (hereinafter referred to also as a "curing step").

(1) Precursor Layer Forming Step

The method for forming the precursor layer for the covering layer on the outer periphery of the conductor wire is not particularly limited so long as it is a method for forming a uniform precursor layer on the entire outer periphery of the conductor wire. A method of letting the curable composition flow by heating, thereby to apply the curable composition to the outer periphery of the conductor, a molding method of extruding the curable composition to cover the outer periphery of the conductor wire therewith (electric wire extrusion molding), etc. may be mentioned.

The application of the curable composition is preferably carried out by application of a coating composition comprising the curable composition and a solvent, preferably a solvent containing a liquid (L). As the coating composition, the above-described coating composition may be used. The coating composition can be applied to the outer periphery of the conductor wire by the same method as the method of applying the curable composition.

As the method of applying the curable composition, a spin coating method, a wipe coating method, a spray coating method, a squeegee coating method, a dip coating method, a die coating method, an ink-jet method, a flow coating method, a roll coating method, a casting method, a Langmuir-Blodgett method, a gravure coating method, etc. may be mentioned. In particular, a dip coating method is preferred.

In a case where a coating film is formed by using the coating composition, the solvent, preferably the solvent containing a liquid (L), is volatilized from the coating film made of the coating composition. By volatilizing and removing the solvent from the coating composition, a precursor layer made of the curable composition will be obtained.

As the method of volatilizing the solvent, a known drying method such as heat drying, vacuum drying or the like may be applied. The drying method may, for example, be heating and drying at from 50 to 300° C. for from 1 to 120 minutes, heating and drying at from 400 to 700° C. for from 1 to 60 seconds, reduced pressure drying under from 0.1 to 500 mmHg for from 1 to 120 minutes, etc. Here, these methods may be used in combination for volatilization of the solvent, i.e. for drying.

(2) Curing Step

The curing step is a step in which the curable composition constituting the precursor layer obtained in the above (1) is cured to form a covering layer made of a cured product. The curing method is appropriately selected from heating, irradiation with active energy rays, and a method of combining these, depending on the type of the curable composition used, specifically, the type of groups (F) in the fluorinated polymer (A).

In a case where groups (F) in the fluorinated polymer (A) are composed of only —$R^{f1}COOR^5$, it is considered that the crosslinking reaction by heating, in particular, the crosslinking reaction by heating at 300° C. or lower is difficult to proceed. Therefore, in such a case, it is preferred to conduct the curing step by irradiation with active energy rays. In a case where groups (F) in the fluorinated polymer (A) contain —$R^{f1}CONR^1NR^2H$ or —$R^{f1}CONR^3OR^4$, it is preferred to conduct the curing step by heating, irradiating with active-energy rays, or a combination thereof. In a case where groups (F) in the fluorinated polymer (A) are a combination of —$R^{f1}CONR^1NR^2H$ and —$R^{f1}COOR^5$, it is preferred to conduct the curing step by heating.

By the curing method of irradiating active energy rays, a cured product, i.e., a covering layer can be obtained at a lower temperature than by the curing method by heating. Thus, in a case where a low temperature treatment is required as a method for forming a covering layer, the curing method by irradiation with active energy rays is preferred. In a case where both heating and irradiation with active energy rays are to be carried out, heating may be conducted before, simultaneously with and/or after irradiation with active energy rays.

(Heat Curing Conditions)

When the precursor layer is heat-cured, the heating temperature is not particularly limited so long as it is a temperature at which the curable components in the curable composition, in particular, groups (F) in the fluorinated polymer (A) undergo a crosslinking reaction. The heating temperature is preferably in a range of from 100 to 300° C. Here, in any of the following cases, it is more preferred that the heating be conducted in an atmosphere of an inert gas such as nitrogen with a view to accelerating the reaction.

For example, in a case where the fluorinated polymer (A) contains two types of groups (F) i.e. —$R^{f1}CONR^1NR^2H$ and —$R^{f1}COOR^5$, the heating temperature is preferably from 100 to 200° C., particularly preferably from 120 to 180° C. The heating time depends on the temperature, but is preferably from 10 minutes to 10 hours, particularly preferably from 30 minutes to 4 hours. A method of increasing the temperature in a stepwise manner is also effective.

In a case where the fluorinated polymer (A) contains —$R^{f1}CONR^1NR^2H$ as groups (F), the heating temperature is preferably from 150 to 300° C., more preferably from 200 to 260° C. The heating time depends on the temperature, but is preferably from 1 minute to 10 hours, more preferably from 1 to 5 hours, further preferably from 2 to 4 hours. A method of increasing the temperature in a stepwise manner is also effective.

In a case where the fluorinated polymer (A) contains —$R^{f1}CONR^3OR^4$ as groups (F), the heating temperature is preferably from 50 to 250° C., more preferably from 70 to 120° C. The heating time depends on the temperature, but is preferably from 1 minute to 10 hours, more preferably from 1 to 5 hours, further preferably from 2 to 4 hours. A method of increasing the temperature in a stepwise manner is also effective.

(Active Energy Ray Irradiation Curing Conditions)

In a case where the precursor layer is cured by irradiation with active energy rays, the wavelength of the active energy rays is not particularly limited so long as it is a wavelength at which the curable components in the curable composition, in particular, groups (F) of the fluorinated polymer (A) will undergo a crosslinking reaction. The wavelength of the active energy rays is preferably from 150 to 300 nm, particularly preferably from 200 to 260 nm. The generation source of the active energy rays may be a metal halide lamp for 250 to 300 nm, a low-pressure mercury lamp for 185 and 254 nm, an excimer lamp for 172 nm and 222 nm, a KrF excimer laser for 248 nm, an ArF excimer laser for 193 nm, or an F2 laser for 157 nm.

By adjusting the irradiation time in accordance with the irradiation intensity of the active energy rays, the curable composition containing the fluorinated polymer (A) can be cured to form a covering layer. For example, the crosslinking can be carried out by irradiating active energy rays with an irradiation strength of from 0.1 to 500 mW/cm$^2$ for about 1 minute to 10 hours. By irradiating active energy rays having the above-mentioned specific wavelength, it is possible to let the crosslinking reaction be proceeded without using a photoinitiator. Here, from the viewpoint of accelerating the reaction, even in the case of irradiation with active energy rays, it is preferred to conduct the irradiation under an atmosphere of an inert gas such as nitrogen.

The electric wire of the present invention has a covering layer containing a cured product of the fluorinated polymer (A). Curing of the fluorinated polymer (A) can be simply carried out by heat- or photo-curing without requiring any special apparatus, and thus, the productivity of the electric wire will be high.

In the electric wire of the present invention, for example, when the dielectric breakdown strength of the cured product of the fluorinated polymer (A) is 20 kV/mm or more, the covering layer has high insulating properties. Since the cured product of the fluorinated polymer (A) has a crosslinked structure, the covering layer is excellent in strength and heat resistance. Since the covering layer has the above characteristics, the electric wire of the present invention is excellent in reliability.

The use of the electric wire of the present invention is not particularly limited. Since the electric wire of the present invention is excellent in insulating properties and heat resistance, it is suitable as a high-voltage electric wire, a communication electric wire, a wiring electric wire used in a motor, a generator, a blast furnace, an electric furnace, an electric heating device, a medical device, an electric scalpel, an automobile, a railway vehicle, an aircraft, a steel mill, a power plant, etc., or an electric wire used especially under high temperatures, such as a substrate for wireless communication using high frequency waves, millimeter waves, etc.

[Coil]

The coil of the present invention is obtained by forming the electric wire of the present invention into a coil shape. The coil of the present invention can be utilized in fields where high insulation properties and heat resistance are required, such as various electric and electronic devices. For example, the coil of the present invention can be used for a motor, a transformer, a power transmitting coil or a power receiving coil for wireless power feeding, etc., and can constitute a high-performance electric/electronic device. The core wire of the coil may be used as a single wire or a twisted wire.

As the method for forming the electric wire into a coil shape, a known method can be applied without any particular limitation. Specifically, the coiled shape means a spirally wound long electric wire. In such a coil, the number of windings of the electric wire, the shape and size of the coil, etc. are not particularly limited. The coil is appropriately adjusted in accordance with various electric and electronic apparatus to which the coil is applied.

EXAMPLES

Hereinafter, the invention will be specifically described with reference to Examples, but the present invention is by no means limited by the following Examples. Evaluations in each Example were conducted in accordance with the methods described below.

[Evaluation Methods]

(Mass Average Molecular Weight)

The mass average molecular weight of the fluorinated polymer was obtained as the molecular weight as calculated as PMMA (polymethylmethacrylate) by gel permeation chromatography (GPC) using, as the solvent, CF$_2$ClCF2CHClF (manufactured by Asahi Glass Co., Ltd., trade name: Asahiklin AK-225G) for the fluorinated polymer P1 and tetrahydrofuran for the fluorinated polymers Q1, Q3, Q4 and R1, R3 and R4.

(Content of Fluorine Atoms in Fluorinated Polymer)

The content of fluorine atoms in the fluorinated polymer was obtained from $^{19}$F-NMR.

(Relative Dielectric Constant, Dielectric Loss Tangent, and Dielectric Breakdown Strength)

Using the films produced in the respective Ex, the relative dielectric constants and dielectric loss tangents at 1 kHz and 1 MHz were measured by using an LCR meter HP4284A manufactured by Agilent Technologies, Inc., a TO-19 constant temperature chamber manufactured by Ando Electric Co., Ltd., and SE-70 type solid-state electrodes manufactured by Ando Electric Co., Ltd. The relative dielectric constants and dielectric loss tangents at 12 GHz and 24 GHz were measured by using a synthesized sweeper 8340B manufactured by YHP, a network analyzer 8510B manufactured by YHP, a cylindrical cavity resonator (material: copper, internal mirror finish), and a semi-rigid cable for signal transmission. The dielectric breakdown strength was measured by using a dielectric breakdown tester HAT-300-100RHO Model manufactured by Yamazaki Sangyo Co., Ltd. Measurement conditions: temperature: 23±2° C., humidity: 50±5% RH, pre-measurement standing time at said temperature and humidity: 40 hours or more. Peripheral medium for breakdown strength measurement: insulating oil.

(Judgment of Solubility)

To 1 mL of a liquid, a fluorinated polymer was added in such an amount that the content would be 5 mass %, followed by stirring and mixing at a temperature of 40° C. for 1 hour, and then cooled to room temperature (25° C.). Judgment was made depending on whether or not 1 mL of the obtained mixture was filterable without clogging by a PTFE filter having a pore size of 0.5 μm and a diameter of 25 mm. "Dissolved" was judged if filtration was possible, and "not dissolved" was judged if filtration was impossible.

[Units]

The units referred to in the following Production Examples are as follows:

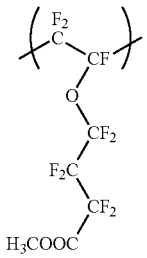
(U1a-1)

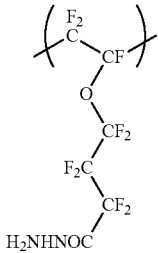
(U1b-1)

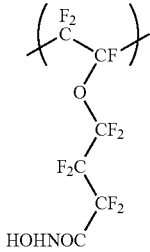
(U1c-1)

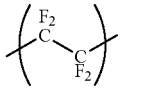
(U2-1)

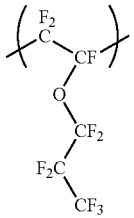
(U3-1)

Production Example 1

A stainless-steel autoclave having an internal volume of 1 L and equipped with a stirrer, was degassed under reduced pressure, and then 0.8 g of a 50 mass % solution of a polymerization initiator, perbutyl PV (tert-butyl peroxypivalate, manufactured by Nippon Oil Co., Ltd.) in Asahiklin AK-225G (manufactured by Asahi Glass Co., Ltd.), 48.5 g of CF$_2$=CFOCF$_2$CF$_2$CF$_2$COOCH$_3$ (hereinafter referred to as MPVB), 795 g of CF$_2$=CFOCF$_2$CF$_2$CF$_3$ (PPVE) and 39.4 g of an Asahiklin AC-2000 (manufactured by Asahi Glass Co., Ltd.) were charged. Further, 120.3 g of CF$_2$=CF$_2$ was injected, and then the internal temperature was raised to 60° C. to carry out polymerization for 4 hours. During this period, 46.4 g of CF$_2$=CF$_2$ (TFE) was further fed to keep the pressure at 1.01 MPaG.

The autoclave was cooled, and the gas was purged, whereupon 600 g of the content was added to a glass beaker containing 6 L of hexane. After removing the upper layer, the lower layer was heated in vacuo to remove residual monomeric components, thereby to obtain 103.3 g of a fluorinated polymer P1. The composition of units in the fluorinated polymer P1 calculated by $^1$H-NMR and 19F-NMR was as follows: units (U1a-1):units (U2-1):units (U3-1)=2:71:27 (molar ratio), the mass average molecular weight was 34,000, and the fluorine atom content was 64 mass %.

Example 1

The fluorinated polymer P1 obtained in Production Example 1 was hot pressed at 80° C. to obtain a transparent film. The transparent film was irradiated by a 200 W low-pressure mercury lamp for 2 hours in a nitrogen atmosphere, and then turned inside out and irradiated for another 2 hours, whereby a cured film FP1 without foaming was obtained. The IR-measurements revealed that the absorption at 1,794 cm$^{-1}$ due to C=O of —COOCH$_3$ group had almost disappeared. The electric properties of the cured film FP1 are listed in Table 1. FP1 exhibited insulating properties comparable to a fluororesin used in conventional extrusion molding.

Further, the fluorinated polymer P1 was dissolved in Asahiklin AC-2000 to form a 10 mass % solution, and a copper wire having a circular cross section (1.5 mm in diameter) was immersed in this solution and then pulled up to apply the P1 solution to the copper wire. Next, the copper wire is dried at 50° C. for 1 hour and 70° C. for 1 hour, then irradiated by a 200 W low-pressure mercury lamp for 2 hours under a nitrogen atmosphere, and then turned over and irradiated for another 2 hours, whereby an electric wire having excellent insulating properties covered with the cured fluorinated polymer is obtained.

Production Example 2

26.5 g of the fluorinated polymer P1 obtained in Production Example 1 was dissolved in 129.1 g of Asahiklin AC-2000, and then 4.0 g of methanol and 0.4 g of a 79 mass % aqueous solution of hydrazine monohydrate were added, followed by stirring at 40° C. for 2 days. The reaction solution was transferred to a petri dish, preliminarily dried under the atmosphere, and then dried under vacuum at 100° C. for 1 day to obtain a fluorinated polymer Q1. By the IR-measurements, it was confirmed that the absorption at 1,794 cm$^{-1}$ due to C=O of a —COOCH$_3$ group had almost disappeared, and the absorption at 1,705 cm$^{-1}$ due to C=O of a —CONH— group had newly occurred.

From the results of the IR-measurements and the analytical results of the fluorinated polymer P1, the composition of the fluorinated polymer Q1 was found to be as follows: units (U1 b-1):units (U2-1):units (U3-1)=2:71:27 (molar ratio), the mass average molecular weight was 34,000, and the fluorine atom content was 64 mass %.

Example 2

The fluorinated polymer Q1 obtained in Production Example 2 was hot pressed at 160° C. to obtain a transparent film. The transparent film was heated at 200° C. for 3 days and at 260° C. for 5 hours in a nitrogen atmosphere, whereby a cured film FQ1 without foaming was obtained. The electric properties of the cured film FQ1 are listed in Table 1. FQ1 exhibited insulating properties comparable to a fluororesin used in conventional extrusion molding.

Further, the fluorinated polymer Q1 was dissolved in Asahiklin AC-2000 to form a 10 mass % solution, and a copper wire having a circular cross section (1.5 mm in diameter) was immersed in this solution and then pulled up to apply the Q1 solution to the copper wire. Next, the copper wire was dried at 50° C. for 1 hour and at 70° C. for 1 hour, and then heated at 200° C. for 1 hour and at 260° C. for 5 hours in a nitrogen atmosphere, to obtain an electric wire having excellent insulating properties covered with the cured fluorinated polymer.

Production Example 3

MPVB and TFE were polymerized by the method described in WO2012/157715 to synthesize a fluorinated polymer P2 with units (U1a-1):units (U2-1)=14:86 (molar ratio). The fluorine atom content of the fluorinated polymer P2 was 69 mass %.

Example 3

The fluorinated polymer P2 obtained in Production Example 3 was hot pressed at 300° C. to obtain a transparent film. The transparent film was irradiated by a 200 W low-pressure mercury lamp for 2 hours in a nitrogen atmosphere, and then turned inside out and irradiated for another 2 hours, whereby a cured film FP2 without foaming was obtained. The electric properties of the cured film FP2 are listed in Table 1. From these values, FP2 exhibited insulating properties comparable to a fluororesin used in conventional extrusion molding.

Further, a powder of the fluorinated polymer P2 was dispersed in FLUTEC PP11 (manufactured by F2 Chemicals Corporation, tetracosafluorotetradecahydrophenanthrene) to form a 10 mass % dispersion in which P2 was swollen, and a copper wire having a round cross section (diameter: 1.5 mm) was immersed in this dispersion and then pulled up to apply the P2 dispersion to the copper wire. Next, the copper wire is dried at 200° C. for 1 hour and at 250° C. for 1 hour, and then irradiated by a 200 W low-pressure mercury lamp for 2 hours under a nitrogen atmosphere, and then reversed and irradiated for another 2 hours to obtain an electric wire having excellent insulating properties covered with the cured fluorinated polymer.

TABLE 1

|  |  | Cured film | | |
| --- | --- | --- | --- | --- |
|  |  | FP1 | FQ1 | FP2 |
| Film thickness | (mm) | 0.68 | 1.07 | 0.45 |
| Relative dielectric constant | (1 kHz) | 2.02 | 2.18 | 2.77 |
|  | (1 MHz) | 2.00 | 2.15 | 2.62 |
|  | (12 GHz) | 2.03 | 2.03 | 2.21 |
|  | (24 GHz) | 2.07 | 2.13 | 2.23 |
| Dielectric breakdown strength | (kV/mm) | 39.1 | 31.8 | 47.1 |
| Dielectric loss tangent | (1 kHz) | 0.0026 | 0.0021 | 0.0064 |
|  | (1 MHz) | 0.0019 | 0.0033 | 0.0200 |
|  | (12 GHz) | 0.0026 | 0.0019 | 0.0220 |
|  | (24 GHz) | 0.0018 | 0.0014 | 0.0170 |

Production Example 4

A fluorinated polymer P3, which is a homopolymer of MPVB, was synthesized by the method described in WO2004/067655. 2.6 g of P3 was dissolved in 11.5 g of Asahiklin AE-3000 (manufactured by Asahi Glass Co., Ltd.), and then 40.5 g of methanol and 1.6 g of a 79 mass % aqueous solution of hydrazine monohydrate were added, followed by stirring at room temperature for 1 day. The reaction solution was preliminarily dried under a stream of nitrogen and then dried under vacuum at room temperature for one day to obtain a fluorinated polymer Q3. The mass average molecular weight of the fluorinated polymer Q3 was 5,000, and the fluorine atom content was 56 mass %. Q3 was soluble in methanol.

Example 4

The fluorinated polymer Q3 obtained in Production Example 4 was heated at 100° C. for 30 minutes, at 200° C. for 30 minutes and at 250° C. for 90 minutes in a nitrogen atmosphere to obtain a cured product FQ3. FQ3 was insoluble when immersed in methanol.

Further, the fluorinated polymer Q3 was dissolved in methanol to form a 10 mass % solution, and a copper wire having a round cross section (diameter 1.5 mm) was immersed in this solution and pulled up to apply the Q3 solution to the copper wire. Next, the copper wire is dried at 50° C. for 1 hour and at 70° C. for 1 hour, and then heated at 200° C. for 30 minutes and at 250° C. for 90 minutes in a nitrogen atmosphere, to obtain an electric wire covered with the cured fluorinated polymer.

Production Example 5

$C(CF_2O(CF_2CF_2O)_kCF_2COF)_4$ (k=7 on average) was synthesized by the method described in Japanese Patent No. 5,028,801, esterified with ethanol and then dried in vacuo to obtain a fluorinated polymer P4 $[C(CF_2O(CF_2CF_2O)_k CF_2COOC_2H_5)_4]$. 2.1 g of the fluorinated polymer P4 was dissolved in 16.3 g of Asahiklin AE-3000, and then 2.8 g of methanol and 0.4 g of a 79 mass % aqueous solution of hydrazine monohydrate were added, followed by stirring at room temperature for 1 day. The reaction solution was preliminarily dried under a stream of nitrogen and then dried under vacuum at room temperature for one day to obtain a fluorinated polymer Q4. By the IR-measurements, it was confirmed that the absorption near 1,800 cm$^{-1}$ due to C=O of a —COOC$_2$H$_5$ group had almost disappeared, and the absorption near 1,700 cm$^{-1}$ due to C=O of a —CONH— group had newly occurred. The mass average molecular weight of the fluorinated polymer Q4 was 4,000, and the fluorine atom content was 61 mass %. The fluorinated polymer Q4 was soluble in methanol.

Example 5

The fluorinated polymer Q4 obtained in Production Example 5 was heated at 100° C. for 30 minutes, at 200° C. for 30 minutes and at 250° C. for 90 minutes in a nitrogen atmosphere to obtain a cured product FQ4. FQ4 was insoluble when immersed in methanol.

Further, the fluorinated polymer Q4 was dissolved in methanol to form a 10 mass % solution, and a copper wire having a round cross-section (1.5 mm in diameter) was immersed in this solution and pulled up to apply the Q4 solution to the copper wire. Next, the copper wire is dried at 50° C. for 1 hour and at 70° C. for 1 hour and then heated at 200° C. for 30 minutes and at 250° C. for 90 minutes in a nitrogen atmosphere, to obtain an electric wire covered with the cured fluorinated polymer.

Production Example 6

2.5 g of the fluorinated polymer P3 described in Preparation Example 4 was dissolved in 11.5 g of Asahiklin AE-3000, and then 23.0 g of methanol and 1.7 g of a 50 mass % aqueous solution of hydroxylamine were added, followed by stirring at room temperature for 1 day. The reaction solution was preliminarily dried under a stream of nitrogen and then dried under vacuum at room temperature for one day to obtain a fluorinated polymer R3. The mass average molecular weight of the fluorinated polymer R3 was 5,000, and the fluorine atom content was 56 mass %. The fluorinated polymer R3 was soluble in methanol.

Example 6

The fluorinated polymer R3 obtained in Production Example 6 was heated at 150° C. for 30 minutes, at 200° C. for 30 minutes and at 250° C. for 90 minutes in a nitrogen atmosphere to obtain a cured product FR3. FR3 was insoluble when immersed in methanol.

Further, the fluorinated polymer R3 was dissolved in methanol to form a 10 mass % solution, and a copper wire having a round cross-section (diameter: 1.5 mm) was immersed in this solution and then pulled up to apply the R3 solution to the copper wire. Next, the copper wire is dried in a nitrogen atmosphere at 50° C. for 1 hour and at 70° C. for 1 hour and then heated at 200° C. for 30 minutes and at 250° C. for 90 minutes in a nitrogen atmosphere, to obtain an electric wire covered with the cured fluorinated polymer.

Production Example 7

2.1 g of the fluorinated polymer P4 described in Production Example 5 was dissolved in 15.3 g of Asahiklin AE-3000, and 5.7 g of methanol and 0.5 g of a 50 mass % aqueous solution of hydroxylamine were added, followed by stirring at room temperature for 4 days. The reaction solution was preliminarily dried under a stream of nitrogen and then dried under vacuum at room temperature for 1 day to obtain a fluorinated polymer R4. By the IR-measurements, it was confirmed that the absorption near 1,800 cm$^{-1}$ due to C=O of a —COOC$_2$H$_5$ group had almost disappeared, and the absorption near 1,700 cm$^{-1}$ due to C=O of a —CONH— group had newly occurred. The mass average molecular weight of the fluorinated polymer R4 was 4,000, and the fluorine atom content was 61 mass %. The fluorinated polymer R4 was soluble in methanol.

Example 7

The fluorinated polymer R4 obtained in Production Example 7 was heated at 90° C. for 95 minutes and at 100° C. for 120 minutes in a nitrogen atmosphere to obtain a cured FR4. FR4 was insoluble when immersed in methanol.

Further, the fluorinated polymer R4 was dissolved in methanol to form a 10 mass % solution, and a copper wire having a round cross section (diameter 1.5 mm) was immersed in this solution, and then pulled up to apply the R4 solution to the copper wire. Next, the copper wire is dried at 50° C. for 1 hour and at 70° C. for 1 hour in a nitrogen atmosphere and then heated at 90° C.° C. for 95 minutes and at 100° C. for 120 minutes in a nitrogen atmosphere, to obtain an electric wire covered with the cured fluorinated polymer.

Production Example 8

5.1 g of the fluorinated polymer P1 described in Production Example 1 was dissolved in 42.8 g of Asahiklin AC-2000, and then 2.4 g of methanol and 0.2 g of a 50 mass % aqueous solution of hydroxylamine were added, followed by stirring at room temperature for 1 day. The reaction solution was preliminarily dried under a stream of air and then dried under vacuum at room temperature for one day to obtain a fluorinated polymer R1. By the IR-measurements, it was confirmed that the absorption near 1,800 cm$^{-1}$ due to C=O of a —COOCH$_3$ group had almost disappeared, and the absorption near 1,700 cm$^{-1}$ due to C=O of a —CONH— group had newly occurred.

From the results of the IR-measurements and the analytical results of the fluorinated polymer P1, the composition of the fluorinated polymer R1 was found to be as follows: units (U1c-1):units (U2-1):units (U3-1)=2:71:27 (molar ratio), the mass average molecular weight was 34,000, and the fluorine atom content was 64 mass %. The fluorinated polymer R1 was soluble in Asahiklin AC-2000 containing 3 mass % of methanol.

Example 8

The fluorinated polymer R1 obtained in Production Example 8 was heated at 90° C. for 95 minutes and at 100° C. for 120 minutes in a nitrogen atmosphere to obtain a cured product FR1. FR1 was insoluble when immersed in Asahiklin AC-2000 containing 3 mass % of methanol.

Further, the fluorinated polymer R1 was dissolved in Asahiklin AC-2000 containing 3 mass % of methanol to form a 10 mass % solution of R1, and a copper wire having a round cross section (diameter: 1.5 mm) was immersed in this solution and then pulled up to apply the R4 solution to the copper wire. Next, the copper wire is dried at 50° C. for 1 hour and at 70° C. for 1 hour in a nitrogen atmosphere and then heated at 90° C. for 95 minutes and at 100° C. for 120 minutes in a nitrogen atmosphere, to obtain an electric wire covered with the cured fluorinated polymer.

This application is a continuation of PCT Application No. PCT/JP2018/005275, filed on Feb. 15, 2018, which is based upon and claims the benefit of priority from Japanese Patent Application No. 2017-039178 filed on Mar. 2, 2017. The contents of those applications are incorporated herein by reference in their entireties.

What is claimed is:

1. An electric wire comprising a conductor wire and a covering layer covering the outer periphery of the conductor wire, wherein the covering layer is made of a cured product of a curable composition containing a fluorinated polymer containing at least three functional groups represented by the following formula (F):

—R$^{f1}$COZ$^1$    (F)

in the formula (F), R$^{f1}$ is a single bond, a fluoroalkylene group, or a fluoroalkylene group with at least two carbon atoms having an etheric oxygen atom between carbon-carbon atoms, Z$^1$ is NR$^1$NR$^2$H or NR$^3$OR$^4$, and R$^1$, R$^2$, R$^3$, and R$^4$ are each independently a hydrogen atom or an alkyl group.

2. The electric wire according to claim 1, wherein the fluorinated polymer contains at least one of the functional groups represented by the formula (F) in a unit represented by the following formula (U1):

in the formula (U1), X$^1$ and X$^2$ are each independently a hydrogen atom or a fluorine atom, Q$^1$ is a single bond or an etheric oxygen atom, R$^{f1}$ is a single bond, a fluoroalkylene group, or a fluoroalkylene group with at least two carbon atoms having an etheric oxygen atom between carbon-carbon atoms, Z$^1$ is NR$^1$NR$^2$H or NR$^3$OR$^4$, and R$^1$, R$^2$, R$^3$, and R$^4$ are each independently a hydrogen atom or an alkyl group.

3. The electric wire according to claim 2, wherein the fluorinated polymer contains at least three units represented by the formula (U1).

4. The electric wire according to claim 1, wherein the fluorinated polymer contains at least three groups represented by the following formula (F1):

—(R$^{f2}$O)$_k$—R$^{f1}$COZ$^1$    (F1)

in the formula (F1), R$^{f2}$ is a C$_{1-4}$ perfluoroalkylene group; k is an integer of from 1 to 200; R$^{f1}$ is a single bond, a fluoroalkylene group, or a fluoroalkylene group with at least two carbon atoms having an etheric oxygen atom between carbon-carbon atoms; Z$^1$ is NR$^1$NR$^2$H or NR$^3$OR$^4$, and R$^1$, R$^2$, R$^3$, and R$^4$ are each independently a hydrogen atom or an alkyl group.

5. The electric wire according to claim 4, wherein the fluorinated polymer is a compound in which three or four groups represented by the formula (F1) are bonded to one carbon atom.

6. The electric wire according to claim 1, wherein the amount of fluorine atoms contained in the fluorinated polymer is from 50 to 76 mass %.

7. The electric wire according to claim 1, wherein the conductor wire is made of a copper conductor or an aluminum conductor.

8. A method for producing the electric wire as defined in claim 1, characterized by covering the outer periphery of the conductor wire with the curable composition to form a precursor layer of the covering layer, and applying heat and/or irradiating active energy rays to the precursor layer, to obtain a covering layer made of a cured product of the curable composition.

9. The method of producing the electric wire according to claim 8, wherein the precursor layer is formed by applying a coating composition comprising the curable composition and a liquid having a boiling point of at most 250° C. to the outer periphery of the conductor wire, and volatilizing the liquid from the applied coating composition.

10. A coil formed by forming the electric wire as defined in claim 1 into a coil shape.

\* \* \* \* \*